(12) United States Patent
Liang

(10) Patent No.: US 8,507,842 B2
(45) Date of Patent: Aug. 13, 2013

(54) METHOD FOR IDENTIFYING 3-D LOCATION OF GAMMA INTERACTION AND FLAT PANEL GAMMA IMAGING HEAD APPARATUS USING THE SAME

(75) Inventor: Hsin-Chin Liang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 958 days.

(21) Appl. No.: 12/608,509

(22) Filed: Oct. 29, 2009

(65) Prior Publication Data
US 2010/0102215 A1    Apr. 29, 2010

(30) Foreign Application Priority Data
Oct. 29, 2008 (TW) ................................. 97141527 A

(51) Int. Cl.
*G01D 18/00* (2006.01)
*H01L 27/00* (2006.01)

(52) U.S. Cl.
USPC .................................. 250/252.1; 250/370.09

(58) Field of Classification Search
USPC ................. 250/252.1, 370.1, 370.09–370.15
See application file for complete search history.

(56) References Cited

U.S. PATENT DOCUMENTS
7,888,651 B2 * 2/2011 Chinn et al. ............. 250/370.13

OTHER PUBLICATIONS

A. Braem; M. Chamizo; E. Chesi; N. Colonna; F. Cusanno; R. De Leo; F. Garibaldi; C. Joram; S. Marrone; S. Mathot; E. Nappi; F. Schoenahl; J. Seguinot; P. Weilhammer; H. Zaidi. Novel design of a parallax free Compton enhanced PET scanner, Elsevier, Science @Direct, www.sciencedirect.com, 2004 Elsevier B.V. A. Braem et al. / Nuclear Instruments and Methods in Physics Research A 525 (2004) pp. 268-274.

* cited by examiner

*Primary Examiner* — David Porta
*Assistant Examiner* — Faye Boosalis
(74) *Attorney, Agent, or Firm* — WPAT, PC; Justin King

(57) ABSTRACT

The present invention provides a method for identifying a 3-D event location of a gamma interaction for enhancing the precision of event location determination and improving the practicability of an edge-on ends-read imaging detector. The method establishes two expected photopeak relations and a mapping table for every unit in the sensor array before imaging. In real practice, two sensing values with respect to the energy of scintillation photons generated during the detection on an event are obtained by the edge-on ends-read imaging detector. Furthermore, two energy windows corresponding to each sensing value are determined according to the corresponding expected photopeak relations. If both the two sensing values fall within the corresponding energy windows respectively, the event location along the long axis of sensor array is determined according to the sensor values with respect to the mapping table mentioned above.

12 Claims, 15 Drawing Sheets

US 8,507,842 B2

METHOD FOR IDENTIFYING 3-D LOCATION OF GAMMA INTERACTION AND FLAT PANEL GAMMA IMAGING HEAD APPARATUS USING THE SAME

FIELD OF THE INVENTION

The present invention generally relates to a location determination method and a sensing apparatus and, more particularly, to a method for identifying a location of gamma interaction where scintillation light is generated and a flat panel gamma imaging head apparatus.

BACKGROUND OF THE INVENTION

Nuclear medicine imaging modalities have become a medical specialty using radioisotopes for diagnosis, treatment, and research. To improve the capability in detecting dread disease (such as cancer) so that the doctor is able to make rapid and correct decisions to perform diagnosis or treatment, nuclear medicine has attracted tremendous attention in some industrialized nations.

The modalities obtain the images regarding the pharmaceutical and bio-functional distributions in the tissues by picking up and processing the energy detected from emitted gammas within the tissues so that the doctor can perform diagnosis and treatment according to the images. Conventionally, there are two approaches to obtain images regarding the pharmaceutical distribution in the tissues. One is positron emission tomography (PET), and the other is single photon emission computed tomography (SPECT). As shown in FIG. 1, positron emission tomography is an imaging tool using paired γ rays generated by annihilations of positrons 80 and electrons 81 so as to tag the pharmaceuticals with isotopes such as F-18, C-11, N-13 and O-15. The pharmaceuticals tagged with isotopes are injected or the like into a bio-body and then enter the tissues under test by various physiological effects so as to achieve non-invasive imaging as the metabolism of the pharmaceuticals are traced. PET has been widely used in diagnosis on malignant tumors, neuropathy and cardiovascular diseases.

Please refer to FIG. 2A, which shows a schematic diagram of a conventional PET apparatus. Generally, the PET apparatus 1 comprises a plurality of sensor arrays 10 arranged as a ring. At the center of the ring, a detection region 11 is provided so as to detect the tissues under test. Each sensor array 10 is structured as shown in FIG. 2B. Generally, the sensor array 10 comprises a plurality of scintillator blocks (comprising, for example, lutetium oxyorthosilicate (LSO)) arranged as a scintillator crystal array 100 and photon detector arrays 101 (using, for example, photomultiplier tubes (PMTs)). The photon detector arrays 101 are coupled to the scintillator crystal array 100 at one end.

Conventionally, the gamma ray is emitted into the top end of the scintillator block array (referring to FIG. 2C) to interact with molecules in the scintillator to release energy that is then converted into scintillation photons to be emitted from the bottom end of the scintillator block array into the detector arrays. The scintillation light is photo-electro converted by photon detector array and is processed so as to precisely acquire the location within the scintillator block where gamma interaction occurs. After a certain period of time of signal acquiring and accumulating, a 2-D images with the same distribution as the scintillator block array can be obtained for reconstruction of pharmaceutical distribution images. However, on the conventional imaging detector, when the incident angle θ of the gamma ray increases, the possibility of parallax occurrence of scintillation also increases because of the high energy of the gamma ray and the small size of the scintillator crystals. Taking the ray with incident angle θ for example, the actual measured location 103 of the scintillator crystal is one unit away from the ideal incident location 102. When the incident angle becomes larger, for example θ2, the actual measured location 104 of the scintillator crystal is two units away from the ideal incident location 102. The error is referred to as the parallax error to cause blur images and poor quality.

For equipments used for specific portions of human bodies, such as the breasts, flat panel imaging heads, as shown in FIG. 2D, can be used. Practically, the imaging heads move as close as possible to the target object so that the distance between two imaging heads can be reduced to downsize the opening 106 and increase the light receiving angle 105 with reduced wasted gamma ray and thus improved sensitivity of the equipments. However, this leads to higher possibility of occurrence of parallax error to degrade the image quality. If the detectors are capable of providing information such as depth of interaction (DOI), the correct incident location can be derived according to the incident angle and DOI to correct the parallax error.

Recently, there have been lots of reports on DOI detection using multi-layered scintillator block arrays stacked as an imaging head apparatus to achieve detection of DOI by processing signals from different scintillator blocks. Moreover, Braem et al. disclose a positron emission tomography apparatus in Nuclear Instruments and Methods in Physics Research A 525 (2004) 268-274, which uses a plurality of edge-on ends-read detectors 12 arranged in a ring. What Braem et al. disclose is different from FIG. 2B in that the edge-on ends-read detector 12, as shown in FIG. 3, comprises an array 120 having plurality of scintillator blocks. The array 120 is provided with photon detector arrays 121 and 123 on both ends. The γ ray 122 is incident on a specific scintillator block 124 in the array 120 to generate scintillation photons. Since the scintillation photons are uniformly isotropic and the scintillator crystal is totally internally reflective, the scintillation photons 125 and 126 travel towards the photon detector arrays 121 and 123 along the long axis. The scintillation photons decay while traveling because part of the scintillation photons are absorbed by the scintillator crystal. The remaining scintillation photons are then detected by the photon detector arrays 121 and 123 at both ends of the scintillator block 124. Since the sensor array 120 is a 2-D array, two 2-D (y, z) locations can be obtained after the scintillation photons being received by two photon detector arrays. Theoretically, these two (y, z) locations should be pointed to the same scintillator crystal 124. Moreover, a 1-D (x) location (i.e., the location where gamma interaction on the sensor 124) can be obtained according to the relation between the energies of the two detectors (i.e., the scintillation light intensity). With such 3-D locations, 2-D images of the object under test can be reconstructed and parallax errors can be corrected by using DOI information.

However, in the prior art, the uncertainty in location (along the crystal long axis) estimations is significant because it depends on variation of the scintillation light intensity. Therefore, there is need in providing a method capable of choosing from the received events by an expected energy window so that the event location can be precisely estimated for image reconstruction with improved quality.

SUMMARY OF THE INVENTION

The present invention provides a method for identifying a location (along the crystal long axis) of gamma interaction capable of choosing from the received events by an expected energy window so that the event location can be precisely estimated for image reconstruction with improved quality.

The present invention provides a flat panel gamma imaging head apparatus, comprising a scintillator block array having thin and long (longer than 6 cm) scintillator blocks. The long side surfaces of the array receives the incoming gamma rays from radio-pharmaceuticals and the photon detector arrays disposed at two ends of the scintillator block array detect the scintillation photons after gamma interaction. Therefore, an expected energy window is established to choose from the events of gamma interaction to obtain precise location on long axis.

In one embodiment, the present invention provides a method for identifying a location of gamma interaction, comprising steps of: providing an edge-on ends-read imaging head comprising a plurality of edge-on ends-read imaging detectors; in calibration mode, establishing two expected photopeak relations with respect to the location index derived from photopeak energy rations of two photon detector arrays, and a mapping curve (or a position calibration curve) of event locations to the location index values for each crystal; then in real practice, i.e. the imaging mode, obtaining a first energy and a second energy generated during the detection on an event by the two photons detector arrays; deriving the location index of the incoming event from the ratio of the first and the second energies; determining two expected energy windows with applying the derived location index into the expected photopeak relation; and determining the location where the event occurs according to the mapping curve of the event locations to the location index values if both the first energy and the second energy fall within the corresponding expected energy windows.

In another embodiment, the present invention provides a flat panel gamma imaging head apparatus, comprising: at least one edge-on ends-read imaging head, each edge-on ends-read imaging head comprising a plurality of edge-on ends-read imaging detectors arranged as a sensing flat panel, each edge-on ends-read imaging detector comprising: a sensor (scintillation crystal) array; and a pair of photon detector arrays respectively disposed at two ends of the sensor array to detect a first energy and a second energy of scintillation photons from the sensor array; and a control unit being electrically connected to the at least one edge-on ends-read imaging head and capable of determining two expected energy windows with respect to each incoming event which leads a first energy and a second energy respectively from an expected photopeak relation, and also determining the event location according to the position calibration curve of the event locations to the location index values if both the first energy and the second energy fall within their corresponding expected energy windows.

BRIEF DESCRIPTION OF THE DRAWINGS

The objects and spirits of the embodiments of the present invention will be readily understood by the accompanying drawings and detailed descriptions, wherein:

FIG. 4, including sub

DETAILED DESCRIPTION OF THE PREFERRED EMBODIMENT

The present invention can be exemplified but not limited by various embodiments as described hereinafter.

Figure 4A:
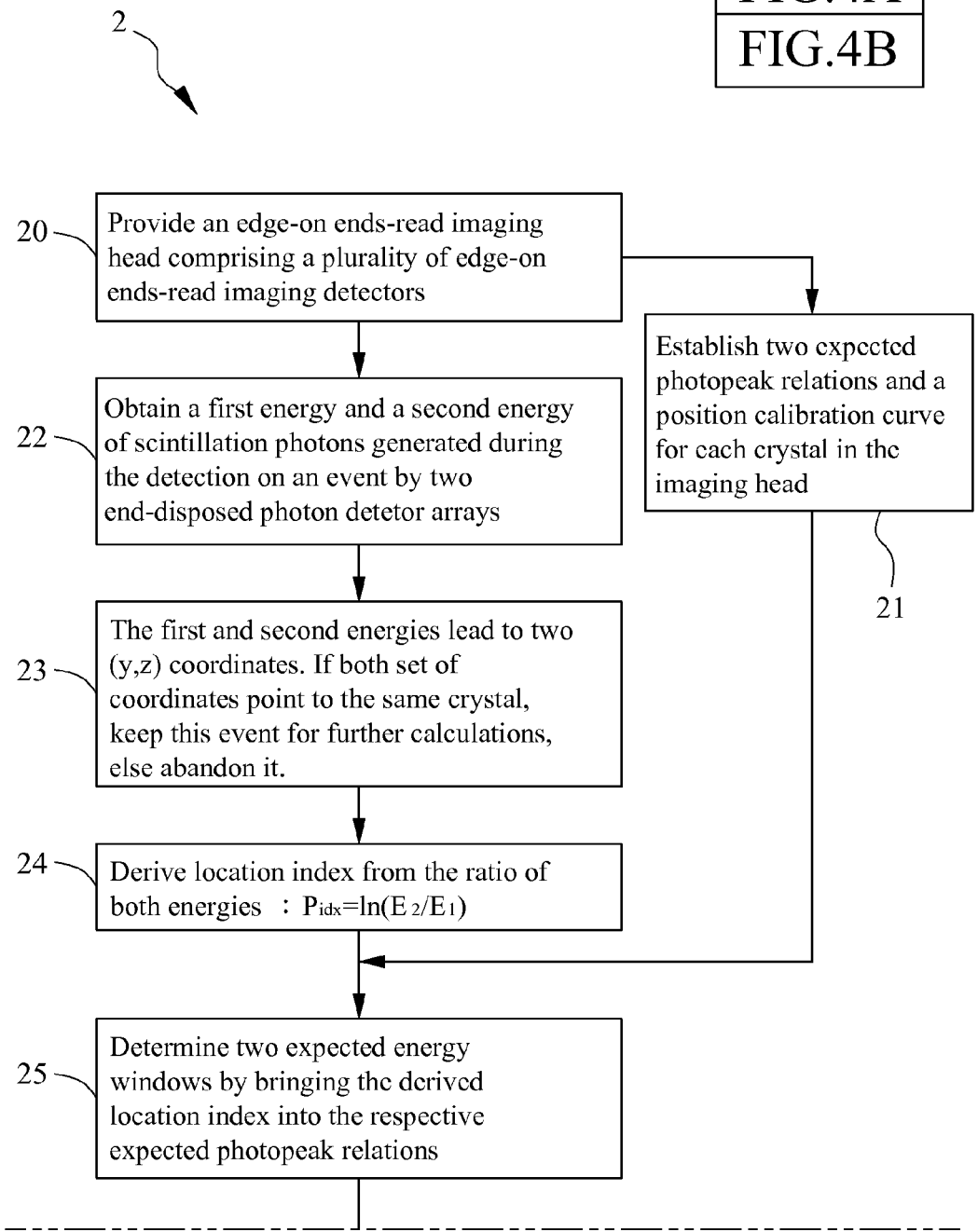
-FIGS. 4A and 4B, is a flowchart of a method for identifying an event location of a gamma interaction according to one embodiment of the present invention.
Figure 4B:
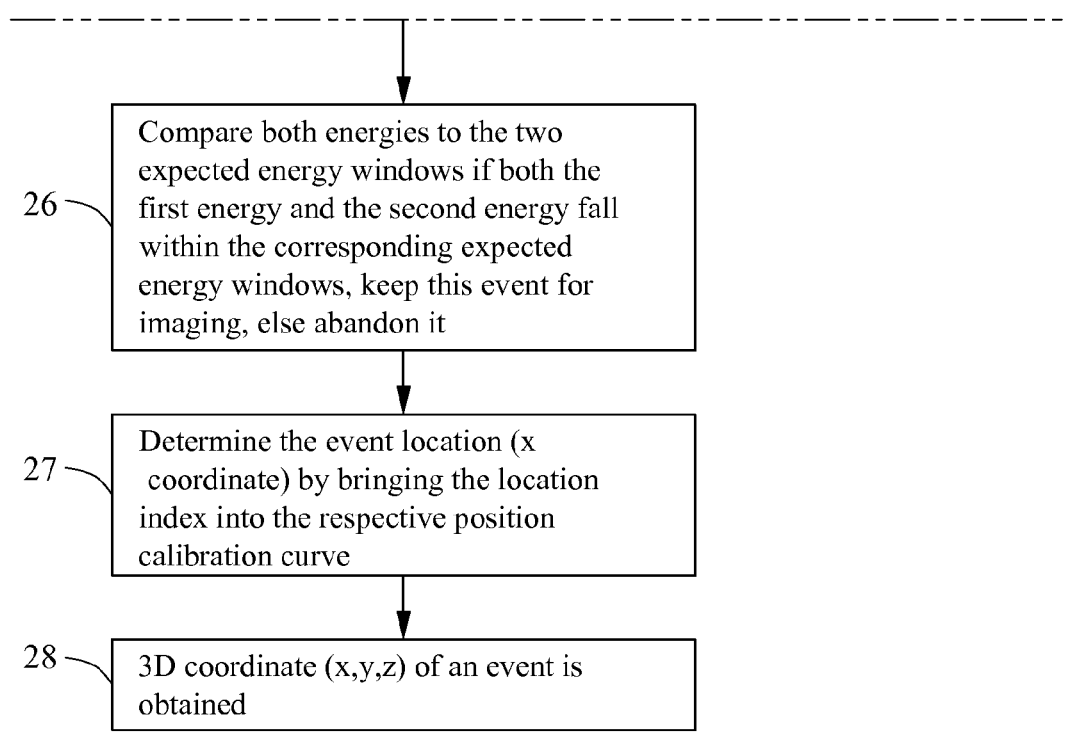
Figure 5:
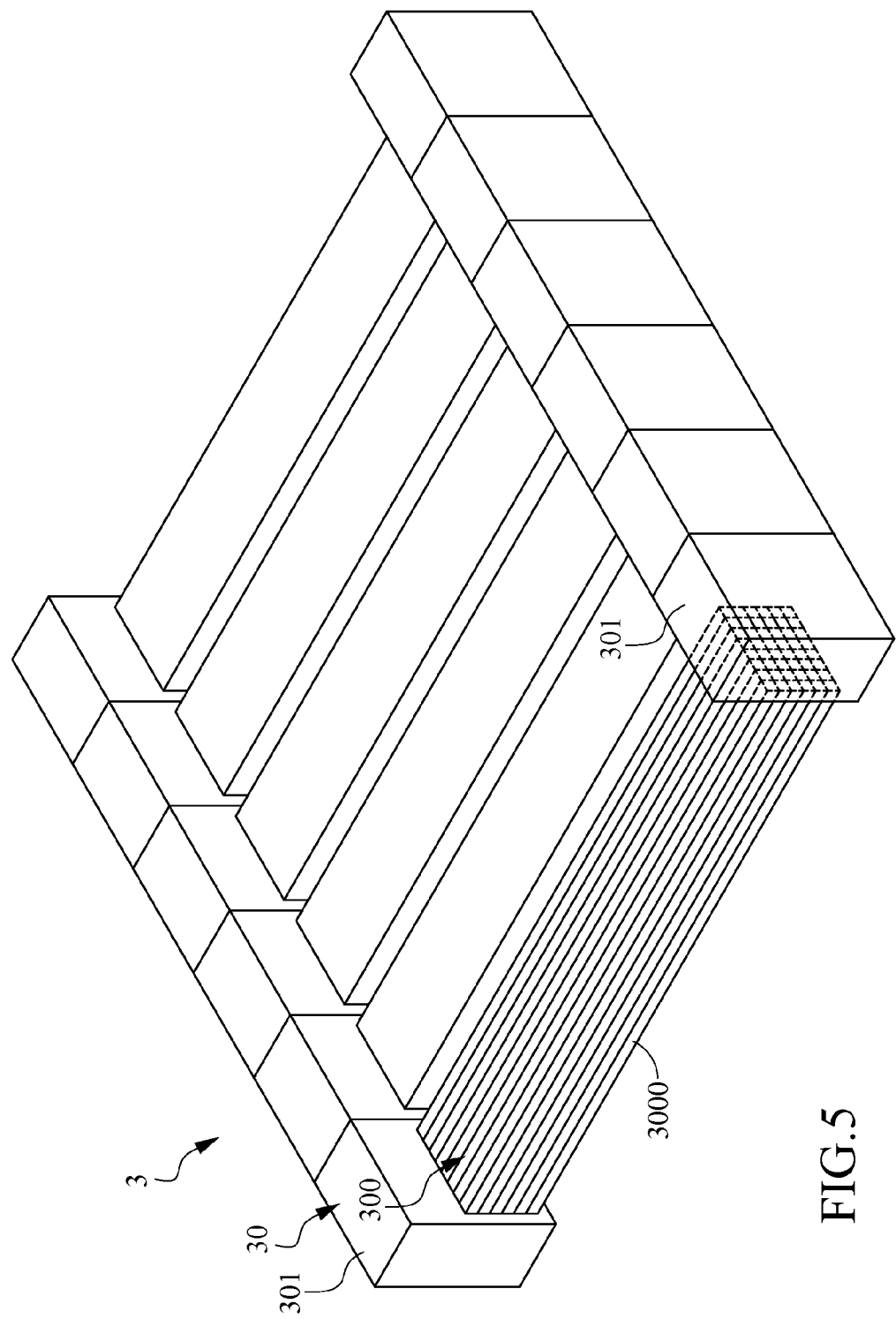
FIG. 5 is a schematic diagram of a flat panel edge-on ends-read imaging head apparatus according to the present invention.

Please refer to FIG. 4, which is a flowchart of a method for identifying an event location of gamma interaction according to one embodiment of the present invention. In the present embodiment, the method 2 comprises steps as described herein. Firstly, step 20 is performed to provide an edge-on ends-read imaging head apparatus as shown in FIG. 5. The edge-on ends-read imaging head apparatus 3 comprises a plurality of edge-on ends-read imaging detectors 30. Each edge-on ends-read imaging detector 30 has a sensor array 300 and a pair of photon detector arrays 301 respectively coupled to both ends of the sensor array 300. The plurality of edge-on ends-read imaging detectors 30 are arranged as a sensing flat panel. Each sensor array 30 comprises a plurality of thin long (longer than 6 cm) sensors 3000 in a 2-D rectangular array. The sensors are scintillator blocks comprising LSO, LYSO, NaI, CsI, SrI, GSO(Z) or LaBr$_3$, but are not limited thereto. The plurality of photon detector arrays 31 are respectively disposed at both ends of the plurality of sensor arrays 30 so as to detect the scintillation photons generated when the gamma ray is captured in the sensor arrays 30. The photon detector arrays 31 comprise PMT array, PSPMT, PSPMT array, SiPM array, PS-SiPM array, APD array or PS-APD array.

Figure 1:
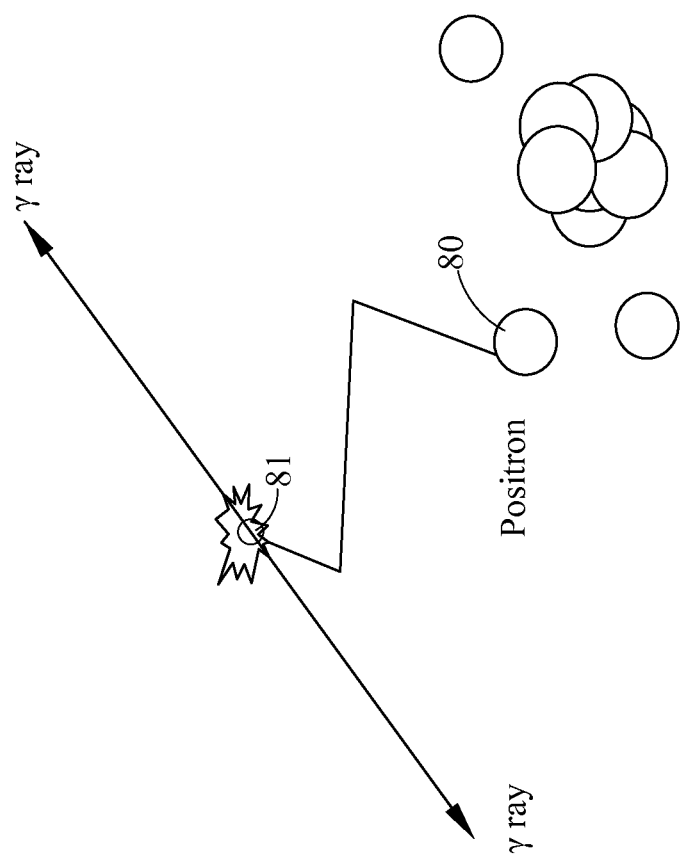
FIG. 1 shows the basic principles of positron emission tomography.
Figure 2A:
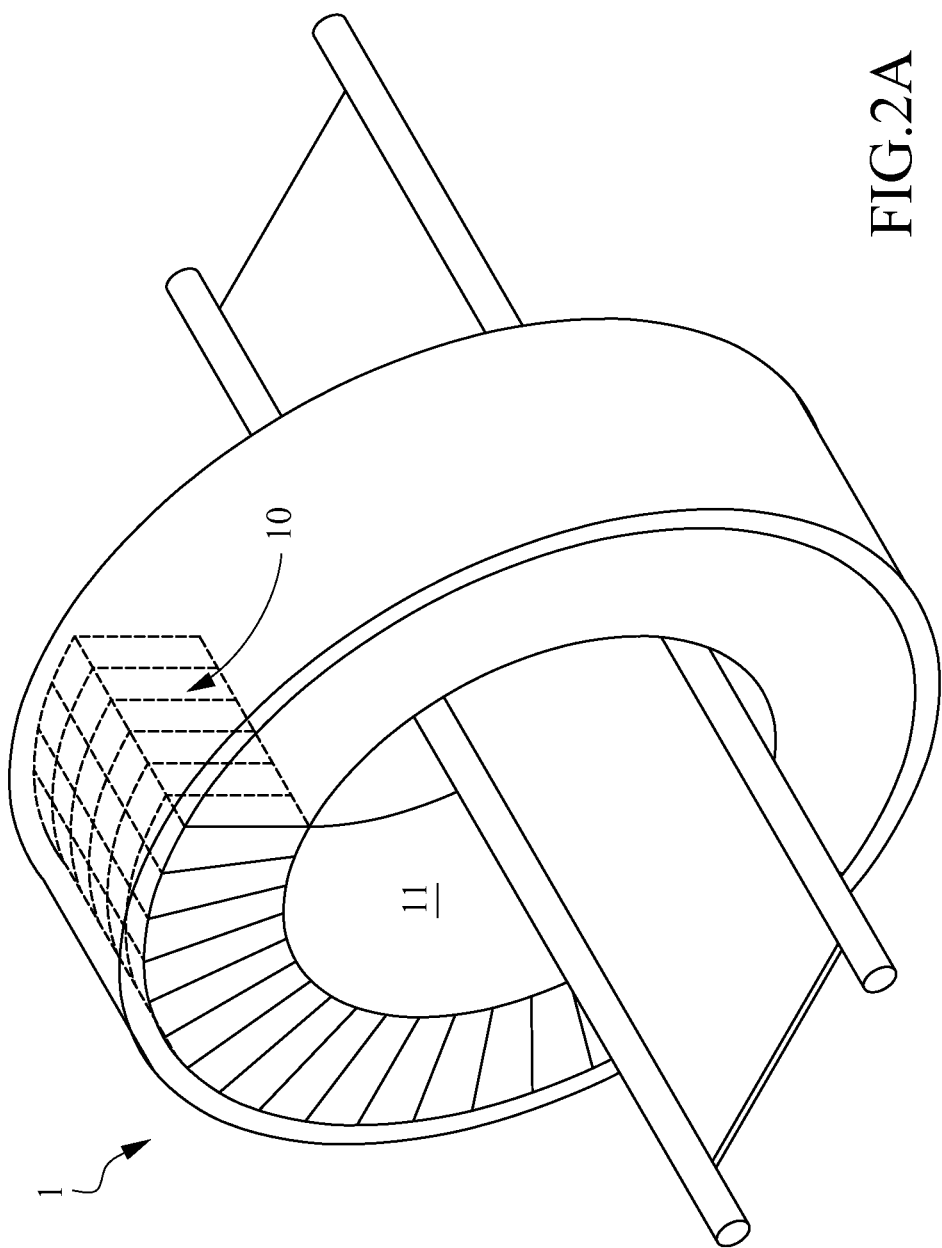
FIG. 2A shows a schematic diagram of a conventional PET apparatus.
Figure 2B:
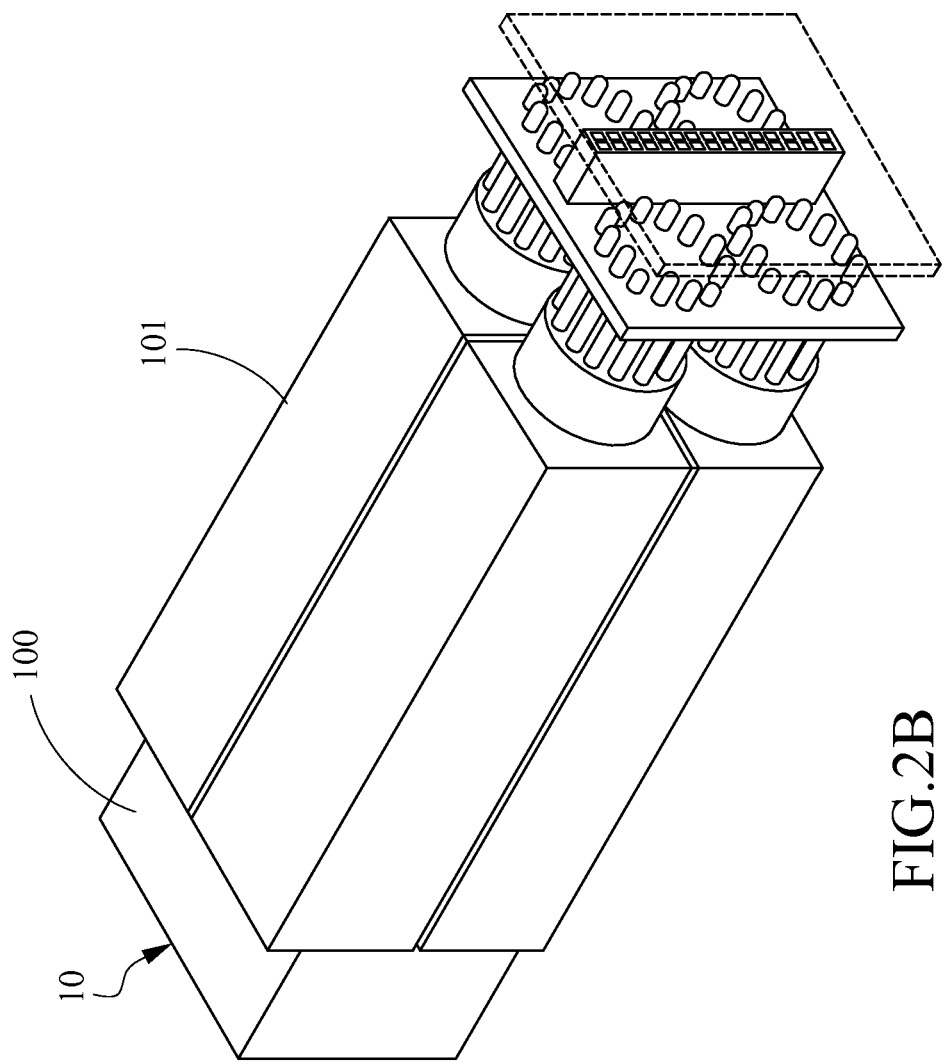
FIG. 2B shows a schematic diagram of a conventional imaging detector.
Figure 2D:
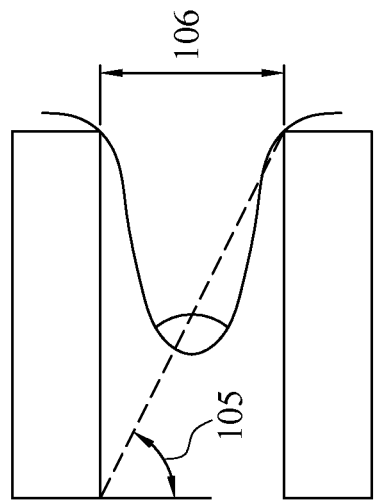
FIG. 2D is a schematic diagram of a flat panel imaging head.
Figure 2C:
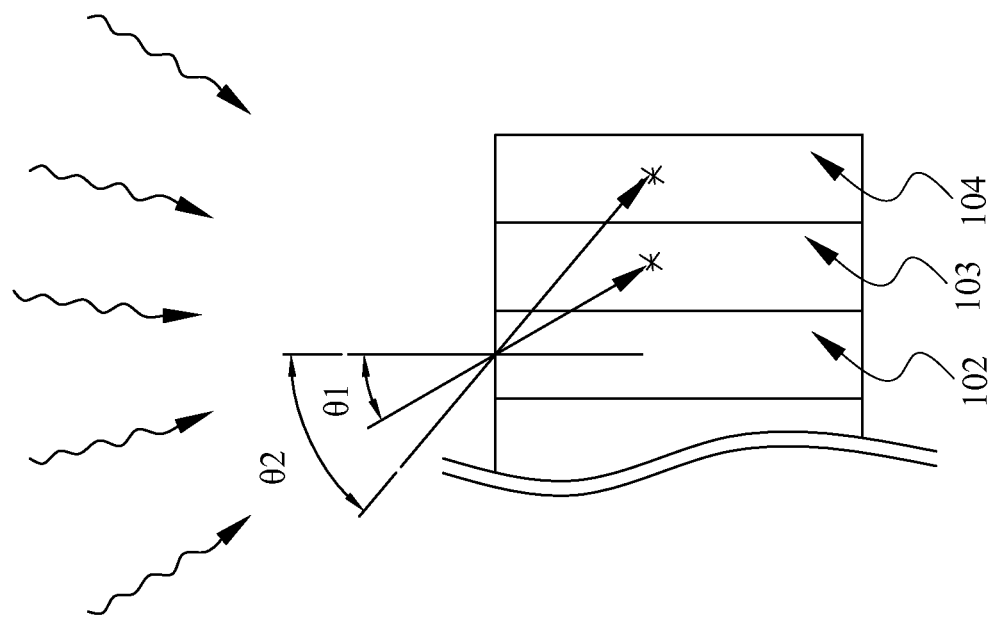
FIG. 2C is a schematic diagram showing parallax error of a conventional imaging detector.
Figure 3:
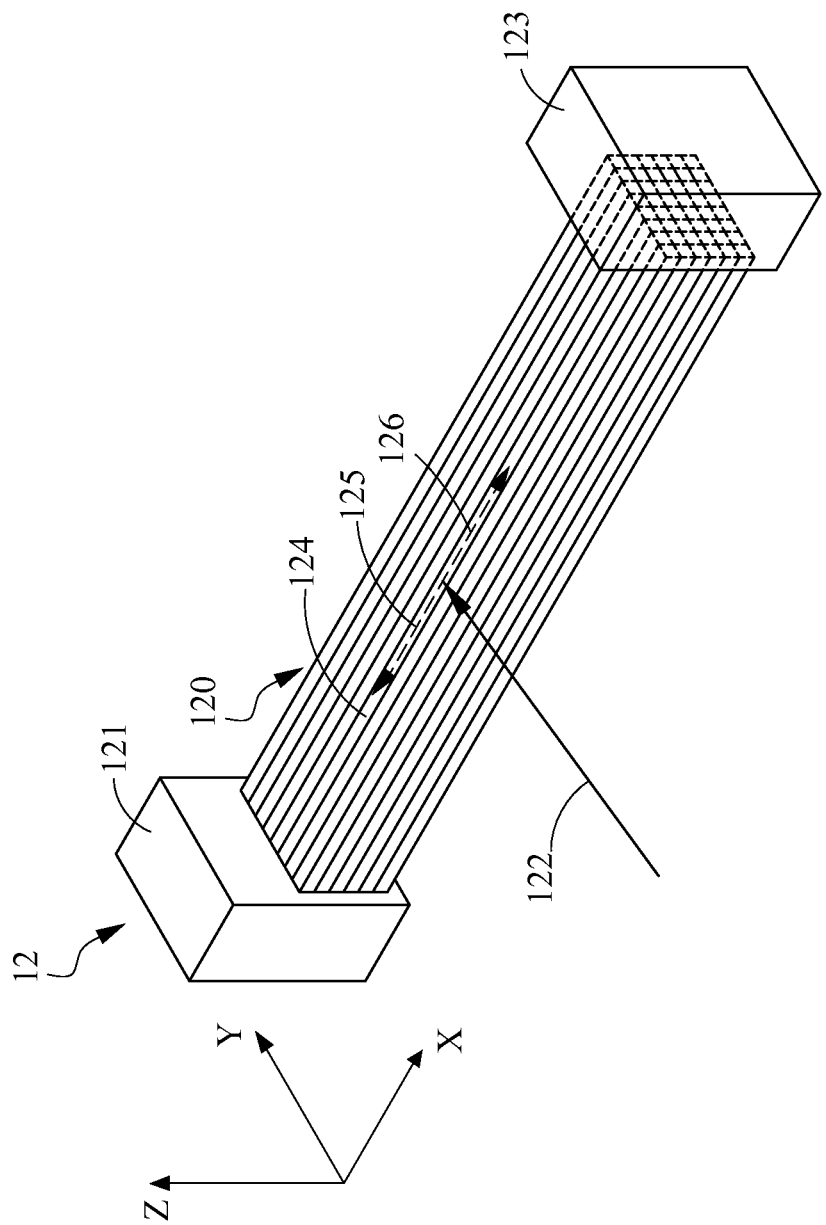
FIG. 3 is a schematic diagram of an edge-on ends-read imaging detector.

Then step 21 is performed to establish two expected photopeak relations which depict the variations of photopeaks of the two photon detector arrays along with their respective location indexes, and one mapping (position calibration) curve which describes the change of event locations with the location indexes for each crystal inside the imaging head. The expected energy window relation can be a look-up table or a fitted curve stating the relation between the location index values of ratios of two photopeaks coming from the two photon detector arrays at two ends of the sensor array 300 and the respective photopeaks when the collimated line source at the specific location. Accordingly, scintillation photons travel along both directions towards the photon detector arrays at two ends of the sensor array. The intensity of the scintillation light gets weaker the longer it travels. However, the variation becomes more significant. Therefore, the expected photopeak relations mentioned above are applied for each incoming event to acquire two expected photopeaks and establish two respective energy windows for its first and second energies. Accordingly, the events can be chosen according to the two expected target energy windows. Moreover, such a look-up table or curve can be varied according to the materials used for the scintillator crystals because the scintillation light intensities generated in each scintillation material after gamma interaction is different. For example, the scintillation light intensity generated in LSO or LYSO is weaker, while the scintillation light intensity generated in NaI or $LaBr_3$ is stronger. Accordingly, the user has to establish energy relations corresponding to different scintillation materials. Moreover, the energy relation of locations where events occur can be realized by a look-up table (the position calibration curve mentioned above) showing the relation between the event location where the γ ray decays on the sensor (along the x-axis in FIG. 3) and the location index coming from the energy ratio of the two photon detector arrays.

Figure 6:
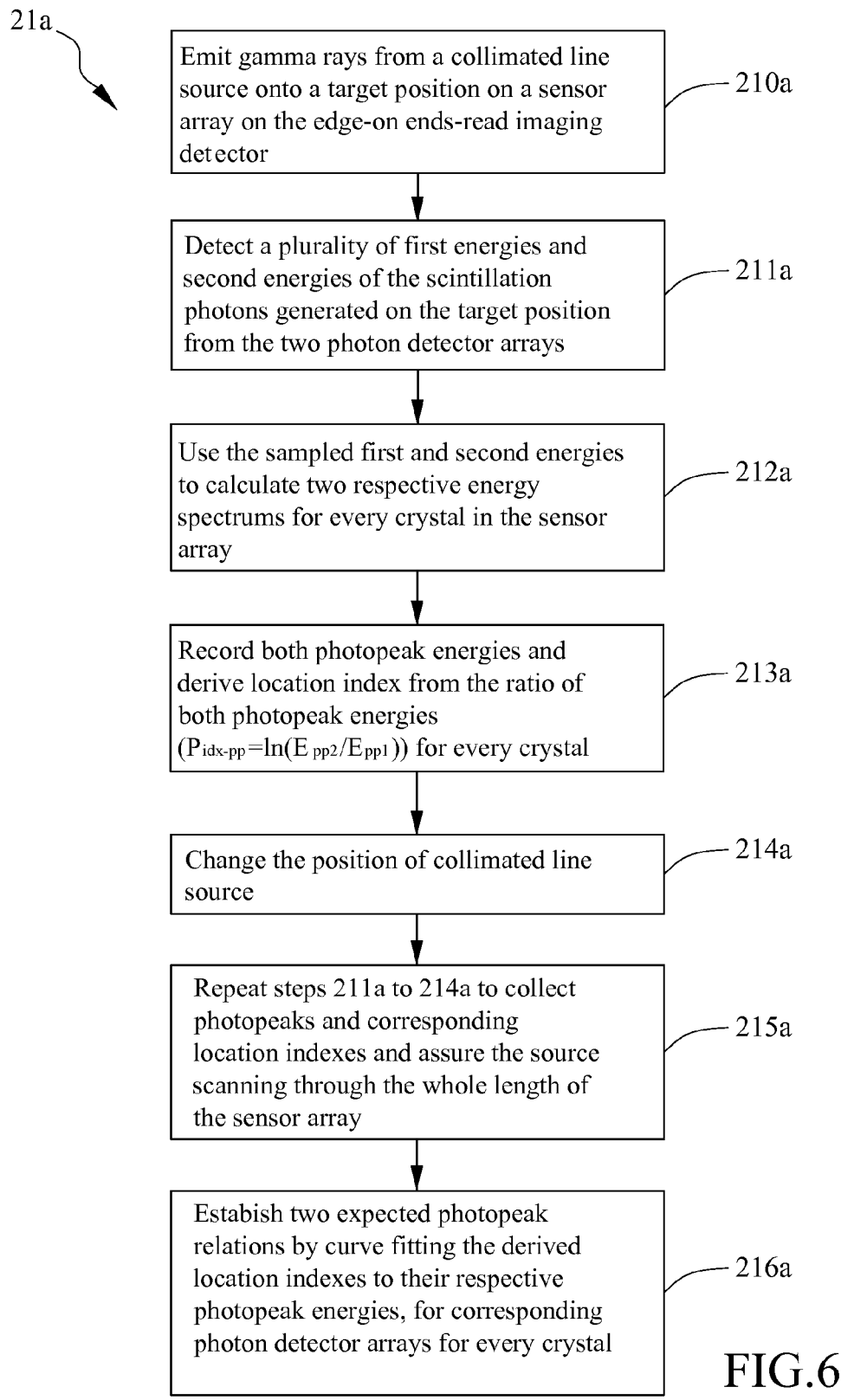
FIG. 6 is a flowchart for establishing an expected energy window relation according to the present invention.
Figure 7A:
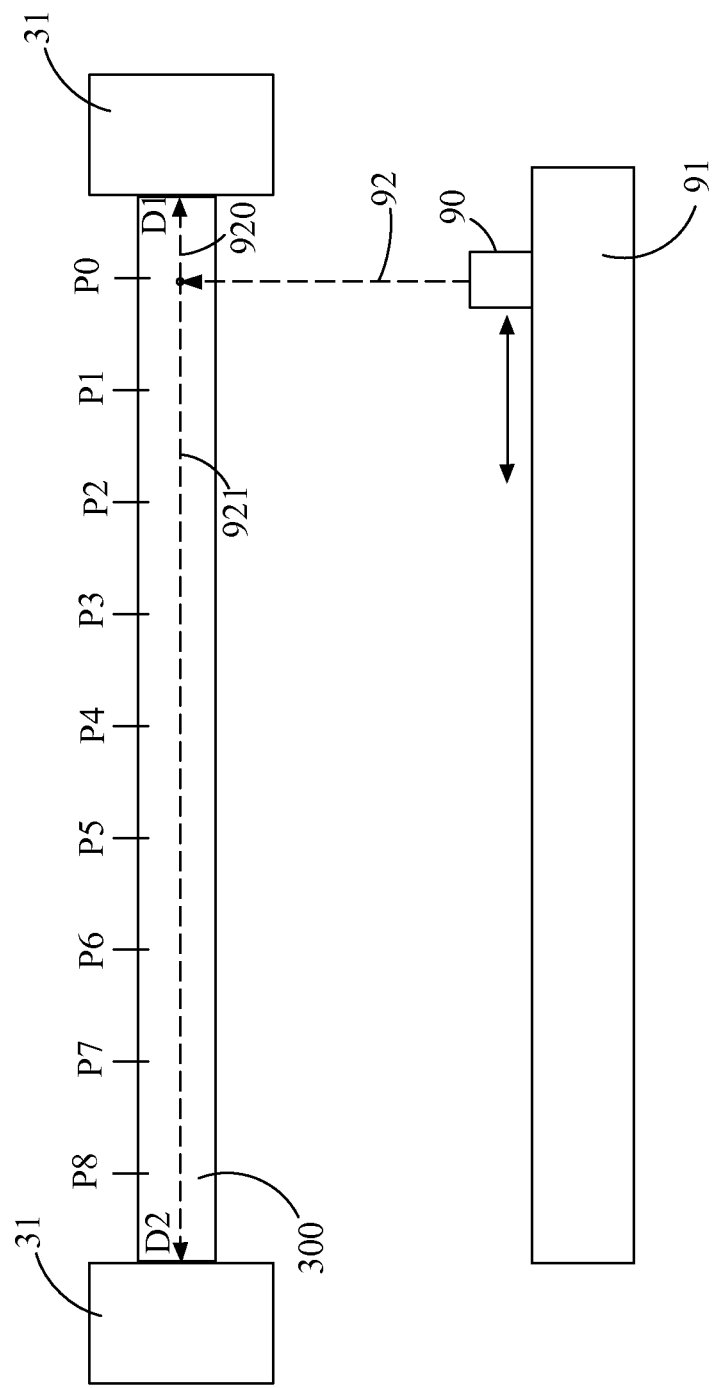
FIG. 7A is a schematic diagram showing the relation between a collimated line source and an edge-on ends-read imaging detector unit.

Please refer to FIG. 6, which is a flowchart for establishing sets of expected energy window relations according to the present invention. Each set includes two relations for the two photon detector arrays and corresponds to on crystal. The flowchart 21a for establishing the energy relations 21a uses an edge-on ends-read imaging detector and comprises steps described herein. Firstly, step 210a is performed to emit gamma rays from a collimated line source onto a target position on a sensor (along x-axis) on the edge-on ends-read imaging head. As shown in FIG. 7A, which is a schematic diagram showing the relation between a collimated line source and an edge-on ends-read imaging detector unit. In FIG. 7A, only a single sensor 300 is shown to denote the sensor array of the edge-on ends-read imaging detector. The collimated line source 90 is capable of providing a collimated γ ray 92 and is disposed on a movable sliding rail 91 so as to use the sliding rail 91 to control the location of the collimated source 90 along x-axis and change the location where the γ ray 92 enters the scintillator crystal.

Figure 7B:
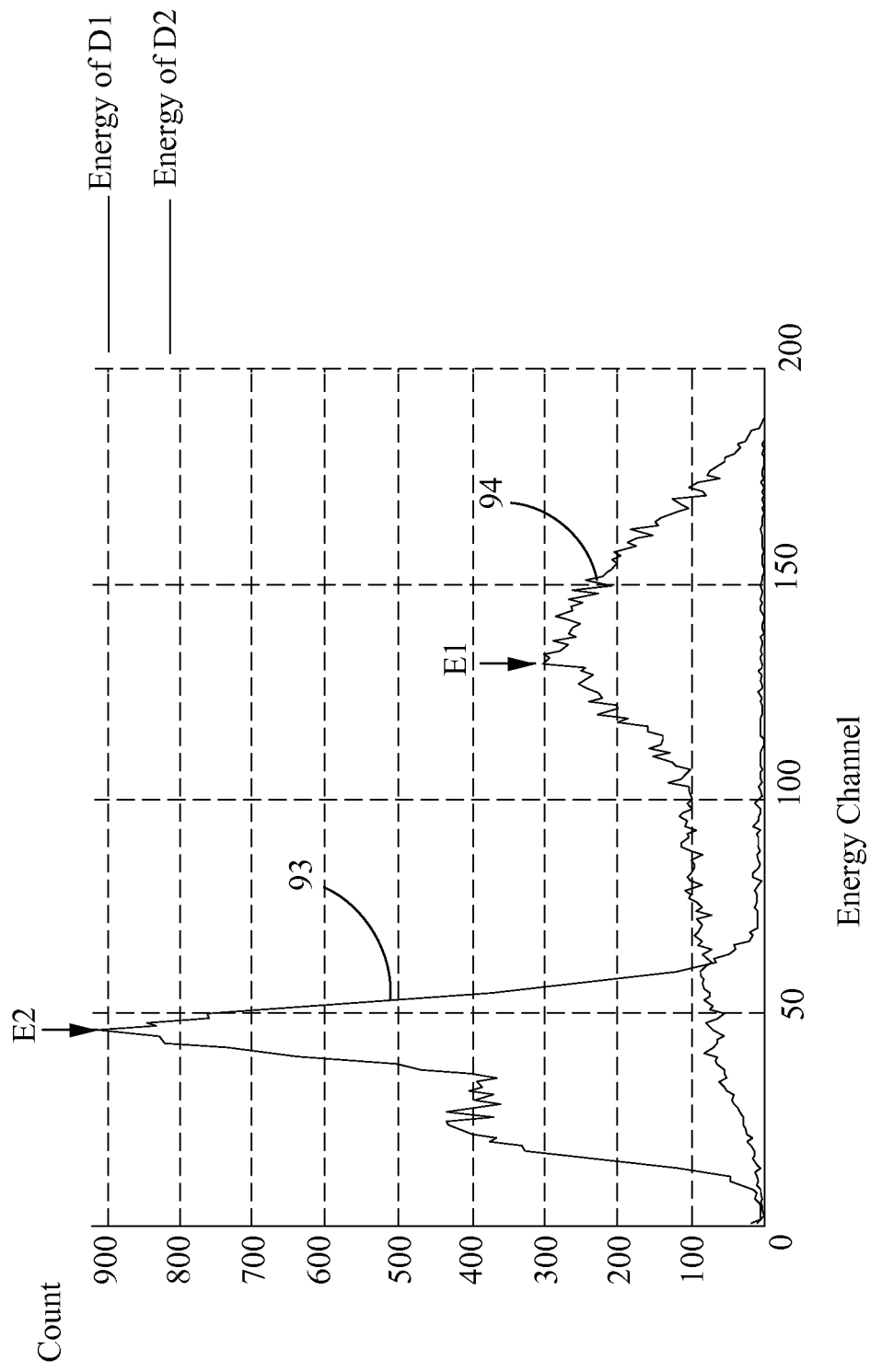
FIG. 7B is a spectrum showing the first energy and the second energy detected by photon detector arrays at two ends of the edge-on ends-read imaging apparatus with respect to gamma rays with specific energy (511 keV) from the collimated line source and hitting on the spot P0 in FIG. 7A.

Then, step 211a is performed to detect a plurality of first energies and second energies of the scintillation photons generated on the target position from the two photon detector arrays. When the collimated source 90 is disposed at location P0, the emitted γ ray is incident on the sensor 300 and is converted into a pair of scintillation photon beams 920 and 921. The scintillation photons 920 lead a first energy E1, while the scintillation photons 921 lead a second energy E2. E1 and E2 can be detected by the photon detector array 31 and converted into electric signals so as to be calculated. After a short period of data collections, E1s and E2s can be exhibited in the form of energy spectrums, as shown in FIG. 7B. The curve 93 represents the relation between the energy E1 and the counts, while the curve 94 represents the relation between the energy E2 and the counts. The peaks of these two curves are the expected (target) photopeak energies. The optical signals can be converted into electrical signals and result in energies by conventional techniques that are well known to anyone with ordinary skill in the art and thus will not be presented herein. Then, step 212a is performed to transfer the first energies (E1s) and the second energies (E2s) into two respective energy spectrums (like those shown in FIG. 7B) for every crystal. Taking the location P0 in FIG. 7A for example, the obtained first expected photopeak energy Epp1 and second expected photopeak energy Epp2 with respect to the corresponding location index ln(Epp2/Epp1) are denoted by A0 and A0' in FIG. 7C. Then, step 213a is performed to record all the photopeaks and their corresponding location indexes for every crystal. These numerical values are reserved for establishing the expected photopeak relations.

Figure 7C:
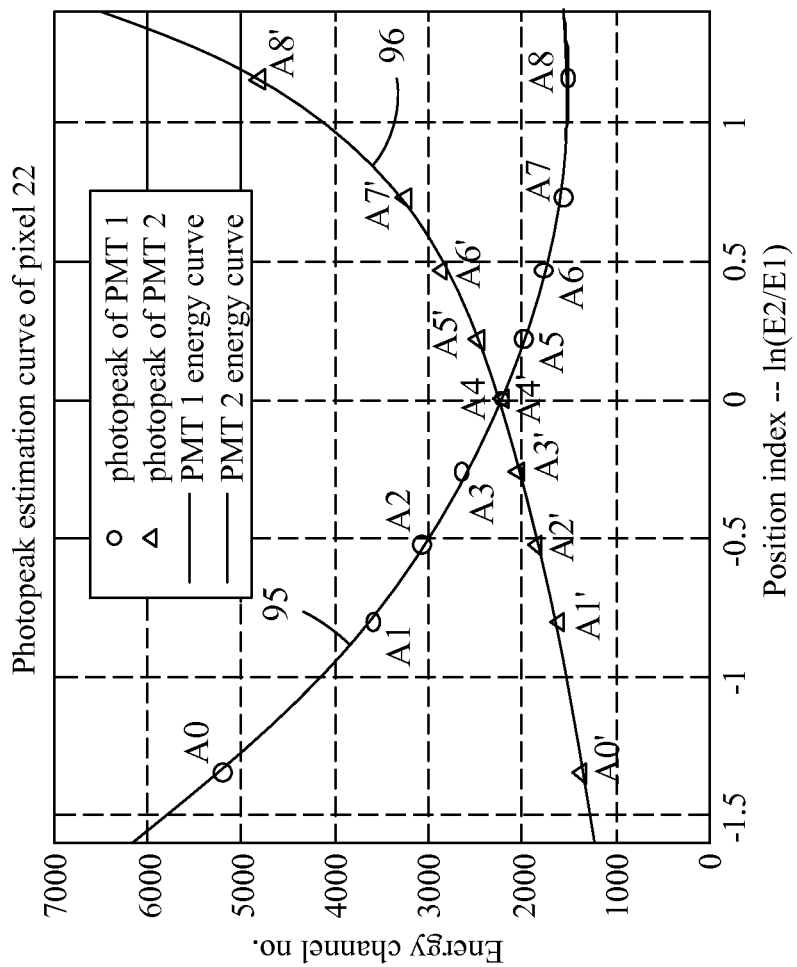
FIG. 7C is a set of curves showing the photopeaks of photon detector arrays at two ends of the edge-on ends-read imaging apparatus with respect to their respective location index values which are derived from photopeak energies of the two photon detector arrays.

Then, step 214a is performed to change the target position of the collimated line source. As shown in FIG. 7A, the present step is performed to the location from P0 to P1. In step 215a, steps 211a to 214a are repeated for scanning the whole length of the sensor 300 and obtaining all photopeaks and the corresponding location indexes of photon detector arrays 31. A1 and A1' in FIG. 7C denote respectively the first expected photopeak energy Epp1 and the second expected photopeak energy Epp2 with respect to their corresponding location index on location P1. When steps 211a to 214a are repeated for a couple of times, the first photopeak energies $E_{pp1}$s and the second photopeak energies $E_{pp2}$s and their corresponding location indexes for all the locations P0 to P8 are obtained and stored. Then step 216a is performed to establish the expected photopeak relation for each crystal with using the stored data by curve fitting analysis. A set of relations for one crystal is shown in FIG. 7C. In FIG. 7C, curve 95 is the relation between location index and $E_{pp1}$ at different locations in the sensor 300, while curve 96 is the relation between location index and $E_{pp2}$ at different locations in the sensor 300. By use of the curves in FIG. 7C under different ln(E2/E1) conditions, i.e. different incoming events, two expected photopeak energies can be obtained for each of them. A range with center at the expected photopeak energy can be established as the expected energy window of the present invention. The width of the expected energy window can be arbitrarily determined by the user. The wider the window is, the less precise the estimation of the location on the x-axis. On the contrary, the narrower the window, the more precise the estimation of the location, which is attributed to the fact that more events have been filtered out. In the present embodiment, the precision is ±7.5%. The foregoing flowchart is based on the photopeak relations establishing of a single sensor array 300. Since each imaging head comprises a plurality of sensor arrays, the forgoing flowchart 21a has to be repeated several times to establish the expected photopeak relations for all the sensor arrays in the imaging head. For example, if there are 6 sensor arrays in each imaging head, the flowchart 21a has to be repeated 6 times to obtain the expected photopeak relations for all the crystals in sensor arrays and in the imaging head.

Figure 8:
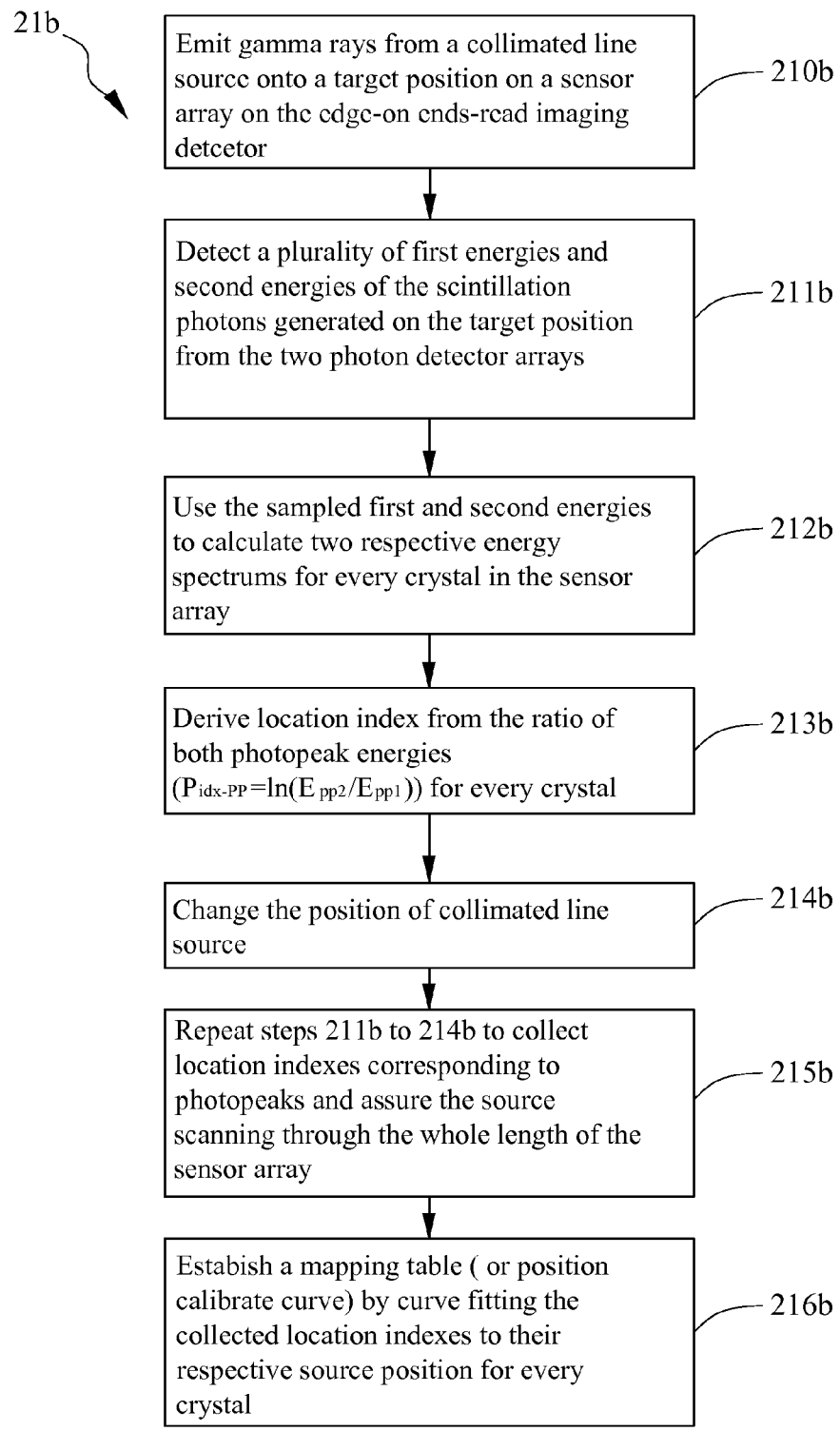
FIG. 8 is a flowchart for establishing the mapping (or position calibration) curve of the event location to the location index value derived from the ratio between the first energy and the second energy.

Please refer to FIG. 8, which is a flowchart for establishing the mapping tables (position calibration curves) of the event locations to the location index values. In the flowchart 21b for establishing the energy relation of locations where events occur, steps 210b to 212b are similar to the steps 210a to 212a in the flowchart 21a. In other words, a plurality of locations A0 to A8 is defined on each sensor array. Then, a collimated source 90 is capable of providing a collimated γ rays 92 and is disposed on a movable sliding rail 91 so as to use the sliding rail 91 to control the location of the collimated source 90 and change the location where the γ rays 92 enters the scintillation crystal. When the collimated source 90 is disposed at location P0, the emitted γ rays are incident on the sensor 300 and are converted into pairs of scintillation photon beams 920 and 921. The scintillation photons 920 lead first energies E1, while the scintillation photons 921 lead second energies E2. E1 and E2 can be detected by the photon detector arrays 31 and converted into electric signals so as to be calculated.

Then, step 213b is performed to derive location index from the ratio of both photopeak energies ($P_{idx-pp}=\ln(E_{pp2}/E_{pp1})$) for every crystal. In this step, all location indexes for all crystals with respective to a line source position are derived and recorded. Then, step 214b is performed to change the position of the collimated line source, which is like the step 214a described foregoingly. In step 215b, steps 211b to 214b are repeated to collect location indexes corresponding to photopeak for establishing the mapping table for every crystal. Then step 216a is performed to establish a mapping table (or position calibration curve) by curve fitting the collected location indexes to their respective source position for every crystal.

Figure 9:
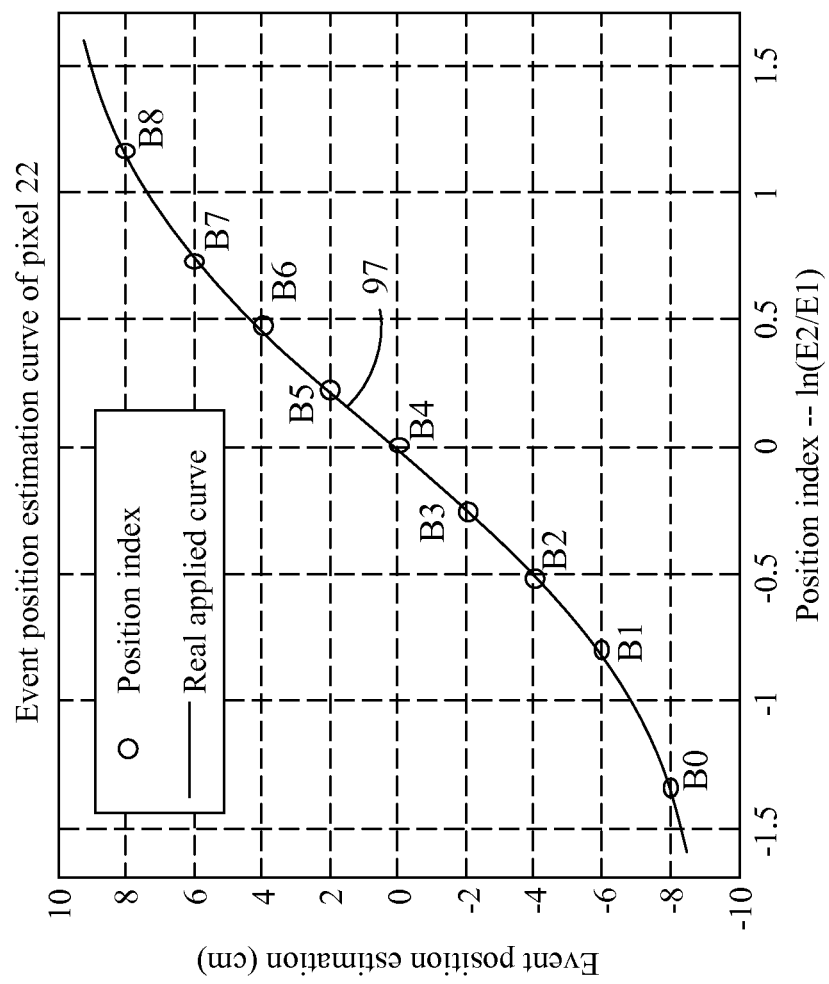
FIG. 9 is a position calibration curve showing the event location of gamma interaction with respect to the location index in FIG. 8.

As shown in FIG. 9, B0 denotes the relation of the location index $\ln(E_{pp2}/E_{pp1})$ of photopeaks with respect to the location P0 in FIG. 7A. As the steps 211b to 215b are repeated, B0 to B8 can be obtain to represent the relation between the location indexes ln(E2/E1) with respect to different locations P0 to P8. Similarly, the relation curve 96 (i.e. the position calibration curve) result from numerical analysis (i.e. curve fitting) to obtain the energy relation on the location where the event occurs with respect to the sensor array 300. The foregoing flowchart is based on a single imaging head. Since each imaging head comprises a plurality of sensor arrays, the forgoing flowchart 21b has to be repeated several times to establish the calibration curves for all the sensor arrays in the imaging head. For example, if there are 6 sensor arrays in each imaging head, the flowchart 21b has to be repeated 6 times to obtain the calibration curves for all the crystals in the sensor array, and all sensor arrays in the imaging head.

Referring to FIG. 4, after step 21 being completed, imaging process (step 22 to 28) is capable to be practiced. Step 22 is performed to obtain a first energy and a second energy of scintillation photons generated during the detection on an event by the edge-on ends-read imaging detectors. In the present step, the object under test may have been injected with pharmaceuticals with isotopes. Paired 511-Kev γ rays are generated during annihilation of positrons and electrons. When the γ rays emitted incident on the sensor array in FIG. 5, scintillation photons are generated at a location where an event occurs inside a crystal of the sensor array. The paired scintillation photon beams are detected by the photon detector arrays at two ends of the sensor array to obtain a corresponding first energy E1' and a corresponding second energy E2'.

Then, in step 23, the first and second energies lead to two (y, z) coordinates. For the process belonging to conventional technology, it will not be stated here. If both set of coordinates point to the same crystal, keep this event for further calculations, else abandon it. In the present step, the first energy E1' and the second energy E2' have been detected by the detectors arrays in step 22. Then, the location index from the ratio of both energies E1' and E2' are calculated by performing step 24. After that, step 25 is performed to determine two expected energy windows by bringing the derived location index into the respective expected photopeak relations like the one depicted in FIG. 7C. Then, in step 26, comparing both energies to the two expected energy windows, if both the first energy and the second energy fall within the corresponding expected energy windows, keep this event for imaging, else abandon it. In the current step, the location where the event occurs is determined according to the relation between the first energy E1' and the second energy E2' in mapping table if both the first energy E1' and the second energy E2' fall within the corresponding expected energy windows. On the contrary, if one of the first energy E1' and the second energy E2' does not fall within the corresponding expected energy window, the scintillation light event is not a reliable event.

If the E1' and E2' are reliable, step 27 is performed to determine the event location (coordinate x) by brining the location index into the crystal respective position calibration curve like the on shown in FIG. 9, wherein the relation between E2' and E1' (i.e. the position index) is used to determine the location (on the x-axis) where the scintillation light event occurs. The location on (y, z) is determined according to the signal detected by the photon detector arrays, as is conventionally known and is not repeated herein. Accordingly, the 3-D location (x, y, z) of gamma interaction is determined in step 28. Repeating steps 20 to 28 for a couple of times, a great amount of information related to the location where the gamma ray is incident on the sensor to generate scintillation photons can be obtained and stored for later image reconstruction.

Figure 10:
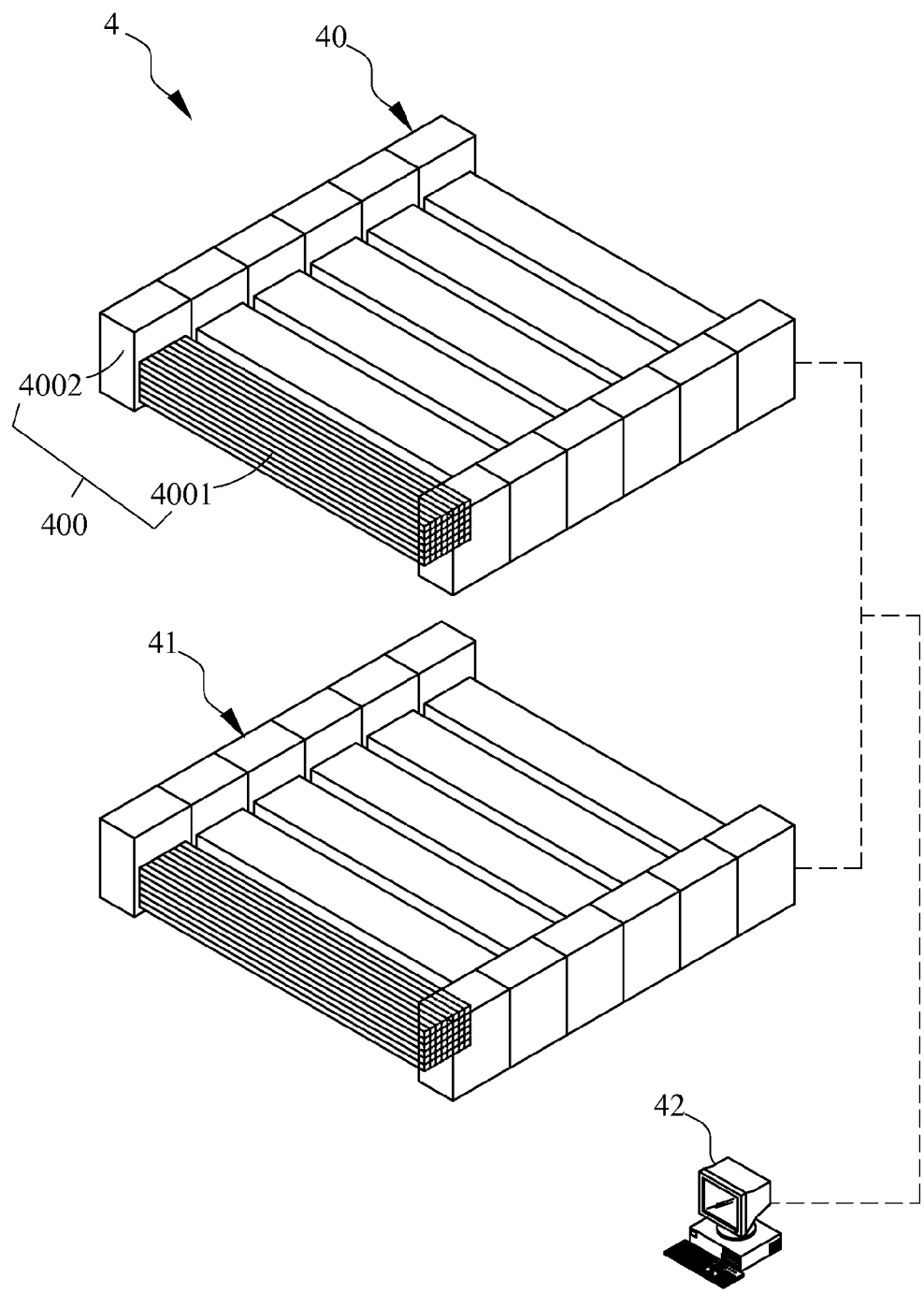
FIG. 10 is a 3-D view of a pair of flat panel gamma imaging head apparatus according to the present invention.

Please refer to FIG. 10, which is a 3-D view of a flat panel gamma imaging head apparatus according to the present invention. In the present invention, at least a pair of flat panel gamma imaging head apparatuses is required. In FIG. 10, a radiation sensing apparatus 4 comprises at least a pair of flat panel gamma imaging heads 40 and 41 and a control unit 42. The pair of flat panel gamma imaging heads 40 and 41 are disposed opposite to each other with a distance therebetween. Each flat panel gamma imaging head 40 or 41 comprises a plurality of edge-on ends-read imaging detectors 400 arranged as a flat panel. Each of the edge-on ends-read imaging detectors 400 comprises a sensor (crystal) array 4001 and a pair of photon detector arrays 4002. The pair of photon detector arrays 4002 are disposed at two ends of the sensor array 4001 so as to detect scintillation photons from the event of gamma interaction in the sensor array 4001. The scintillation light generated in each event corresponds to a first energy and a second energy from the two photon detector arrays.

The control unit 42 is electrically connected to the at least one edge-on ends-read imaging head 40 and/or 41. The control unit 42 is capable of determining two expected energy windows with respect to the location index which is derived from the ratio of the first energy to the second energy from an expected energy window relation of the "fired" crystal, and then determining a 3-D location where the event occurs according to the relation of the location index in mapping table (i.e. x-coordinate) and also the coordinates of the "fired" crystal (y and z) if both the first energy and the second energy fall within the corresponding expected energy windows. The control unit 42 can be implemented using an electronic calculating device such as a personal computer, a workstation, a server, or a special purpose (dedicated) electronic module. It is noted that, in the present embodiment of the invention, the paired γ rays generated due to annihilation of positrons and electrons are only exemplary. The invention of an imaging device which capable of offering 3D locations of incident gamma events can also be applied in gamma camera and SPECT (single photon emission computed tomography). Even though, in the embodiment in FIG. 10, a pair of flat panel edge-on ends-read imaging heads 40 and 41 is used to exemplify the embodiment, it is also possible to use only a single flat panel edge-on ends-read imaging head, as shown in FIG. 5. In FIG. 5, the single flat panel edge-on ends-read imaging head is used to detect a single photon, instead of the annihilated radiation from paired positrons. The single flat panel edge-on ends-read imaging head can be operated similarly as previously described, and thus is not presented herein.

Accordingly, the present invention discloses a method for identifying a 3-D location of gamma interaction where scintillation light is generated and a flat panel gamma imaging head apparatus. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for identifying a 3-D location of gamma interaction, comprising steps of:
    providing an edge-on ends-read imaging head comprising a plurality of edge-on ends-read imaging detectors;
    establishing two expected photopeak relations and a position calibration curve for each crystal in each edge-on ends-read imaging detectors in calibration mode;
    in real practice, obtaining a first energy and a second energy of scintillation photons generated during the detection on a gamma incident event by the edge-on ends-read imaging detectors, wherein the first and second energies lead to two (y,z) coordinates;
    determining whether both set of coordinates point to the same crystal, keep this event for further calculations, if so keep the event, else abandon the event;
    deriving a location index by calculating natural log of ratio of the first energy and second energy with respect to the event whose both set of coordinates point to the same crystal;
    determine two expected energy windows by bringing the derived location index into two (crystal-depending) expected photopeak relations;
    comparing the first energy and the second energy to the two expected energy windows if both the first energy and the second energy fall within the corresponding expected energy windows, keep this event for imaging, else abandon it; and
    determine the event location (x coordinate) by bringing the location index into the crystal respective position calibration curve for completing the 3-dimensional coordinate (x, y, z) of the event.

2. The method for identifying a 3-D location of a gamma interaction as recited in claim 1, wherein the step of establishing the expected photopeak relations for each crystal in the sensor array further comprises steps of:
    (a) emitting gamma rays from a collimated line source onto a target position on the sensor array along its long axis of the edge-on ends-read imaging detector/head;
    (b) detecting a plurality of first energies and second energies of the scintillation photons generated on the target position from the two photon detector arrays;
    (c) using the sampled first and second energies to calculate two respective energy spectrums for every crystal in the sensor array;
    recording the photopeak energy of the spectrum from the first sampled energies, the second photopeak energy of the spectrum from the sampled energies and the location index corresponding to the ratio of both the photopeaks;
    (d) changing the target position;
    (e) repeating steps (b) to (d) to scan the whole length of the sensor array; and
    (f) establishing the variations of the first photopeak energies and the second photopeak energies corresponding the location indexes to obtain expected photopeak relations for every crystal in the sensor array.

3. The method for identifying a 3-D location of a gamma interaction as recited in claim 2, wherein the sensor comprises a scintillation material.

4. The method for identifying a 3-D location of a gamma interaction as recited in claim 1, wherein the step of establishing the mapping table for each crystal in the sensor array (or the position calibration curve) further comprises steps of:
    (a) emitting a gamma ray from a collimated line source onto a target position on the sensor array along its long axis of on the edge-on ends-read imaging detector/head;
    (b) detecting a plurality of first energies and second energies of the scintillation photons generated on the target position from the two photon detector arrays;
    (c) using the sampled first and second energies to calculate two respective energy spectrums for every crystal in the sensor array;
    recording the location index deriving from the ratio of two photopeak energies from the two spectrums and the target (source) position.
    (d) changing the target position;
    (e) repeating steps (b) to (d) to scan the whole length of the sensor array; and
    (f) Establish a mapping table (or position calibrate curve) by curve fitting the collected location indexes to their respective source position for every crystal.

5. The method for identifying a 3-D location of a gamma interaction as recited in claim 4, wherein the sensor comprises a scintillation material.

6. The method for identifying a 3-D location of a gamma interaction as recited in claim 1, further comprising steps of building a mapping table (or a position calibration curve) for location (along long axis) estimation and two expected photopeak relations for energy filtering for every crystal before use and being applied in real practice. These relations are all based on the location indexes of photopeaks.

7. The method for identifying a 3-D location of a gamma interaction as recited in claim 1, wherein the accordance for estimating location (along the long axis) is the location index based on the ratio between the first sampled energy and the second sampled energy.

8. The method for identifying a 3-D location of a gamma interaction as recited in claim 1, wherein the location index is the natural logarithm of the ratio between the first sampled energy and the second sampled energy.

9. A flat panel gamma imaging head apparatus, comprising:
    at least one edge-on ends-read imaging head, each edge-on ends-read imaging head comprising a plurality of edge-on ends-read imaging detectors arranged as a sensing flat panel, each edge-on ends-read imaging detector comprising:
        a sensor array; and
        a pair of photon detector arrays respectively disposed at two ends of the sensor array to detect a first energy and a second energy of scintillation photons generated in the sensor array; and
        two expected photopeak relations and a position calibration curve for every crystal are generated and stored before use;
    a control unit being electrically connected to the at least one edge-on ends-read imaging head and capable of determining two expected energy windows from the expected photopeak relations and determining the event location along the long axis of the sensor array according to the relation of the location index in the mapping table (or position calibration curve) for every incoming event if both the first energy and the second energy fall within the corresponding expected energy windows.

10. The flat panel gamma imaging head apparatus as recited in claim 9, wherein the sensor array comprises a scintillation material.

11. The flat panel gamma imaging head apparatus as recited in claim 10, wherein the scintillation material is L(Y)SO, NaI, CsI, SrI, GSO(Z) or $LaBr_3$.

12. The flat panel gamma imaging head apparatus as recited in claim 10, wherein the photon detector arrays are photomultiplier tube (PMT) arrays, position sensitive photomultiplier tubes (PSPMT), PSPMT arrays, position sensitive silicon photomultipliers (PS-SiPM), PS-SiPM arrays, avalanche photodiode (APD) arrays, position sensitive avalanche photodiodes (PSAPD), PSAPD arrays or silicon photomultiplier (SiPM) arrays.

* * * * *